(12) United States Patent
Durfee et al.

(10) Patent No.: US 12,043,151 B2
(45) Date of Patent: Jul. 23, 2024

(54) SEAT THERMAL MANAGEMENT AND POSITIONAL SENSING

(71) Applicant: MAGNA INTERNATIONAL INC., Aurora (CA)

(72) Inventors: Jason A. Durfee, Troy, MI (US); Benjamin Saltsman, Bloomfield Hills, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 15 days.

(21) Appl. No.: 17/908,631

(22) PCT Filed: Mar. 4, 2021

(86) PCT No.: PCT/US2021/020808
§ 371 (c)(1),
(2) Date: Sep. 1, 2022

(87) PCT Pub. No.: WO2021/178625
PCT Pub. Date: Sep. 10, 2021

(65) Prior Publication Data
US 2023/0130566 A1 Apr. 27, 2023

Related U.S. Application Data

(60) Provisional application No. 62/985,505, filed on Mar. 5, 2020.

(51) Int. Cl.
*B60N 2/56* (2006.01)
*B60N 2/00* (2006.01)
(Continued)

(52) U.S. Cl.
CPC ........... *B60N 2/5685* (2013.01); *B60N 2/002* (2013.01); *B60N 2/5891* (2013.01); *H05B 3/145* (2013.01);
(Continued)

(58) Field of Classification Search
CPC .... B60N 2/5685; B60N 2/002; B60N 2/5891; H05B 3/145; H05B 3/347; H05B 2203/029; H05B 2214/04
See application file for complete search history.

(56) References Cited

U.S. PATENT DOCUMENTS 10,556,532 B2 * 2/2020 Gallagher ............ B60N 2/5685
10,978,630 B1 * 4/2021 Sala ..................... B60N 2/5685
(Continued)

FOREIGN PATENT DOCUMENTS

DE 102007001132 A1 7/2008
KR 102037837 B1 10/2019

*Primary Examiner* — Philip F Gabler
(74) *Attorney, Agent, or Firm* — Dickinson Wright PLLC

(57) ABSTRACT

A vehicle seat system is provided that includes heating, cooling, and occupant sensing functionality in a single unit. The system includes carbon nanotube (CNT) elements disposed adjacent the seat surface. The CNT elements may be woven or stitched to a vehicle seat cover, or may be disposed in a mat that is placed between a seat cushion and the seat cover. The CNT elements may be used for heating, cooling, and occupant sensing, without requiring separate units or circuits. The system may include Peltier elements attached to the CNT elements, with the Peltier elements transferring heat between the CNT elements and a heat bank. The heat bank may be in the form of a heat sink, or the heat bank may be the seat rails of the vehicle seat, with the Peltier elements attached to the seat rails.

20 Claims, 7 Drawing Sheets

(51) Int. Cl.
*B60N 2/58* (2006.01)
*H05B 3/14* (2006.01)
*H05B 3/34* (2006.01)

(52) U.S. Cl.
CPC ....... *H05B 3/347* (2013.01); *H05B 2203/029* (2013.01); *H05B 2214/04* (2013.01)

(56) References Cited

U.S. PATENT DOCUMENTS

| | | |
|---|---|---|
| 11,033,058 B2 * | 6/2021 | Cauchy .................. H10N 10/13 |
| 11,034,270 B2 * | 6/2021 | Schwintek ............... B60N 2/40 |
| 11,167,856 B2 * | 11/2021 | Jacob ..................... H05B 3/146 |
| 2006/0090787 A1 | 5/2006 | Onvural |
| 2008/0129475 A1 | 6/2008 | Breed et al. |
| 2008/0142494 A1 | 6/2008 | Blake et al. |
| 2017/0164757 A1 | 6/2017 | Thomas et al. |
| 2019/0184869 A1 | 6/2019 | Galbreath et al. |

* cited by examiner

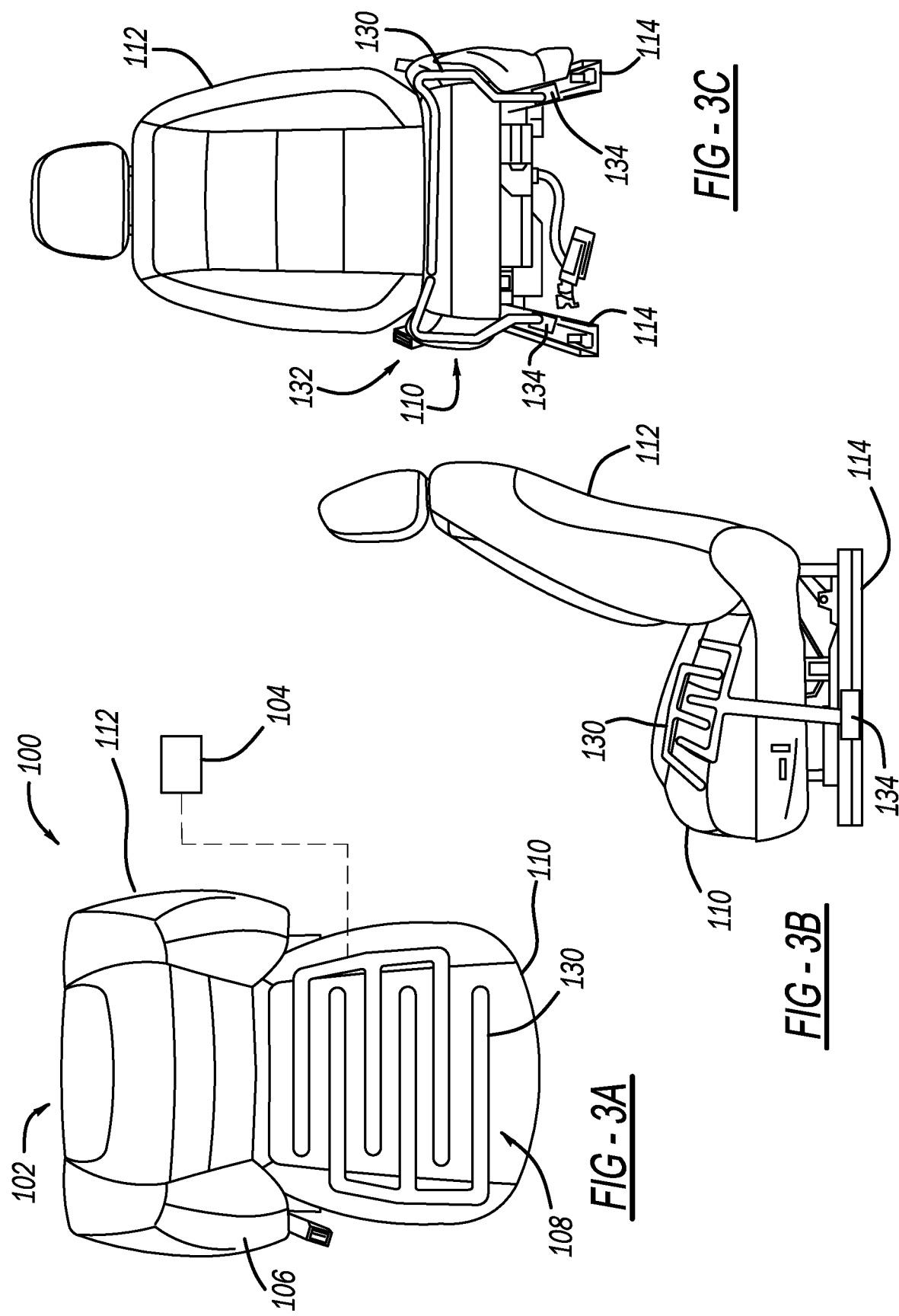

SEAT THERMAL MANAGEMENT AND POSITIONAL SENSING

CROSS-REFERENCE TO RELATED APPLICATIONS

This U.S. National Stage Patent Application claims the benefit of PCT International Patent Application Serial No. PCT/US2021/020808 filed Mar. 4, 2021 entitled "SEAT THERMAL MANAGEMENT AND POSITIONAL SENSING" which claims the benefit of U.S. Provisional Patent Application Ser. No. 62/985,505 filed on Mar. 5, 2020, and titled "Seat Thermal Management And Positional Sensing", the entire disclosures of which are hereby incorporated by reference.

FIELD

The present disclosure is related to vehicle seating systems. More particularly, the present disclosure is related to thermal management and occupant positional sensing in vehicle seating.

BACKGROUND

The ability to regulate temperature within a vehicle is a desirable aspect for vehicle consumers. Vehicle HVAC systems have been in common use for years, allowing the vehicle occupants to increase/decrease the heating and cooling systems within the vehicle to obtain a desirable temperature. Various advances in vehicle heating and cooling have provided further ability to tailor the temperature within the vehicle to suit the needs of individual users.

One aspect of vehicle heating and cooling includes the use of seat heating devices and/or seat cooling devices. Rather than cooling the occupant via forced air from a vent in the vehicle interior, heating and cooling may be applied via contact with the user's body between the body and the vehicle seat.

In a seat heating device, current may be passed through conductive circuits, for example a circuit of nichrome wire. As the current passes through the wire, the resistance in the wire causes the wire to increase in temperature. The increase in temperature may be transferred to the vehicle occupant, who is seated on the vehicle seat adjacent the heating circuit.

In a seat cooling device, a fan may be used to transfer cool air from a cooling mat through apertures formed in the vehicle seat trim, thereby providing cool air to the occupant's body.

Additionally, seat surface temperatures, particularly in hot environments, can be unsafe. The existing cooling solutions utilizing fans can mitigate these surface temperatures, but they also create undesirable amounts of noise, which affects the comfort of the occupants.

Another related aspect of vehicle seat heating and cooling systems is an occupant positional sensing device. Occupant positional sensing devices may be used to determine whether a vehicle occupant is present, in particular for vehicle passengers. Such sensors may be used to trigger whether a passenger side airbag will deploy in case of an accident, or whether or not a fasten seatbelt signal will be emitted if the passenger seatbelt is not buckled. Similarly, the occupant sensor may be used to determine whether to apply seat heating or cooling to the passenger seats. For instance, if no passenger is detected, the heating or cooling circuits may be deactivated.

With these sensors serving different functions, these integrated seat devices are installed as separate devices, which adds complexity and cost to the vehicle, including additional assembly time. These systems have not been combinable because of the different types of technology used for heating (resistive heating) and cooling (convective cooling).

In view of the above, it is desirable for a more compact, simple, and cost-effective solution for regulating vehicle temperature.

SUMMARY

It is an aspect of the present disclosure to provide heating, cooling, and occupant sensing to a vehicle seat in a single unit.

In one aspect, a vehicle seat system includes: a seat structure including leg portion and a back portion; a carbon nanotube (CNT) element attached to at least one of the leg portion and the back portion; a Peltier element attached to the carbon nanotube element; a heatbank attached to the Peltier element; a power supply electrically connected to the Peltier element, wherein the power supply is configured to apply a current to the Peltier element and the CNT element; wherein the Peltier element transfers heat between the CNT element and the heatbank in response to applying the current.

In one aspect, the CNT element is adapted to provide resistive heating and bypass the Peltier element In one aspect, the CNT element is adapted to sense a presence of an occupant in the vehicle seat by deforming in response to the presented of a vehicle occupant to alter the current and/or resistance in the CNT element.

In one aspect, the heatbank is a seat rail of the seat structure.

In one aspect, the heatbank is a heatsink including a plurality of fins.

In one aspect, current passing in a first direction causes heat transfer from the CNT element to the heatbank via the Peltier element, and current passing in a second direction opposite the first direction causes heat transfer from the heatbank to the CNT element via the Peltier element.

In one aspect, the Peltier element is a first Peltier element and the system includes a second Peltier element, wherein the first and second Peltier element are operatively connected to separate CNT elements configured to heat and cool separate portions of the vehicle seat.

In one aspect, the heatbank has the first and the second Peltier elements mounted at opposite ends thereof.

In one aspect, the CNT element is a mat.

In one aspect, the CNT element is woven into a seat cover.

In another aspect, a method of thermally managing a vehicle seat is provided. The method includes: providing a carbon nanotube (CNT) element at a vehicle seat; providing a Peltier element attached to the CNT element; providing a heat bank attached to the Peltier element; applying a current to the Peltier element in a first direction, and in response thereto transferring heat from the CNT element to the heat bank and cooling the CNT element; applying a current to the Peltier element in a second direction opposite the first direction, and in response thereto transferring heat to the CNT element and heating the CNT element.

In another aspect of the invention, CNT can be used as a resistive heating circuit directly, bypassing Peltier element, in addition to or alternatively to using the Peltier element to provide heat via the CNT element.

In one aspect, the method includes detecting a vehicle occupant via the CNT element by detecting a change in current and/or resistance in the CNT element.

In one aspect, the heat bank is in the form of a heat sink.

In one aspect, the Peltier elements are attached to seat rails, and the heat bank is in the form of the seat rails.

In one aspect, the CNT element is woven into a seat cover of the vehicle seat.

In one aspect, the CNT element is a mat disposed between a seat cover and a seat cushion of the vehicle seat.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3A illustrates Carbon Nanotube (CNT) elements disposed on a vehicle seat for heating, cooling, and occupant detection in a single unit, as viewed from above;

FIG. 3B illustrates Carbon Nanotube (CNT) elements disposed on a vehicle seat for heating, cooling, and occupant detection in a single unit, as viewed from the side;

FIG. 3C illustrates Carbon Nanotube (CNT) elements disposed on a vehicle seat for heating, cooling, and occupant detection in a single unit, as viewed from the front;

DETAILED DESCRIPTION OF THE DISCLOSURE

Figure 1:
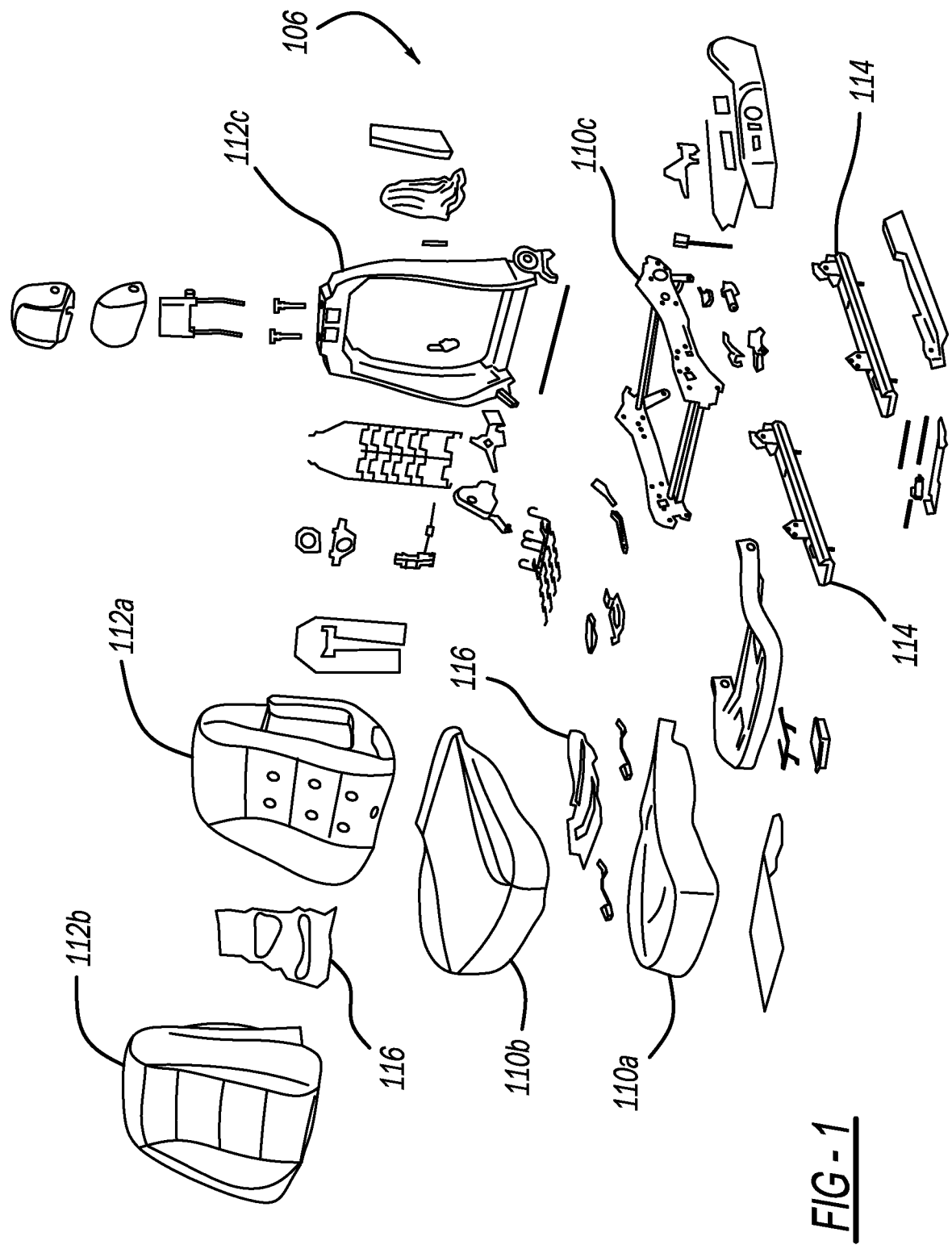
FIG. 1 is an exploded view of a vehicle seat structure, including a leg portion, back portion, frame elements, seat rails, cushions, and seat covers.

Referring now to the Figures, a system 100 for providing thermal management and occupant position sensing is provided. The system 100 may include a seat assembly 102 and a controller 104, illustrated in FIG. 3A. The seat assembly 102 may include various structural components and thermal components, which are controlled by the controller 104, which is operatively connected to the thermal components, as further described below. The controller 104 may include a power supply (not shown) for providing power to the various thermal components, and may further be provided to send and receive signals through a wire harness or the like.

As shown in FIG. 3A, the seat assembly 102 may include both a seat structure 106 and a thermal structure 108. The seat structure 106 may include various structural components configured for supporting a vehicle occupant within the vehicle. The thermal structure 108 may include the components that provide the thermal management capability of the system 100, as further described below. It will be appreciated that the thermal structure 108 may be attached to and/or embedded within the seat structure 106. The seat structure 106 may take on many forms, and may include additional portions not illustrated or described herein. For example, additional modular systems may be installed within the seat structure 106, similar to the thermal structure 108 being installed within and/or on the seat structure 106. It will be appreciated that the seat structure 106 shown herein is non-limiting and that other seat structure forms may be used. For purposes of discussion, the seat structure 106 illustrated herein will be described in further detail, and a skilled artisan will readily appreciate the applicability of the seat structure described herein to other seat structure types.

As shown, the seat structure 106 may include a leg support portion 110 and a back support portion 112. The leg support portion 110 may be the portion that is generally horizontal to the vehicle floor. The back support portion 112 extends upwardly from the rear of the leg support portion 110. The back support portion 112 may be adjustable in a pivotable manner relative to the leg support portion 110.

With reference to the exploded view of FIG. 1, both portions 110 and 112 may include a foam portion 110a, 112a and a cover portion 110b, 112b. Additionally, both portions 110, 112 may include a frame portion 110c, 112c. The frame portions 110c, 112c may be pivotably connected, such that the back portion 112 may pivot relative to the leg portion 110 to accommodate the desired position of the occupant. The frame portion 110c of the leg support portion 110 may be attached to a pair of seat rails 114. The seat rails 114 may be arranged generally parallel to each other along the vehicle floor. The leg portion 110 may thereby be configured to translate along the rails to adjust the position of the seat structure 106 relative the vehicle interior as desired by the occupant.

Figure 2A:
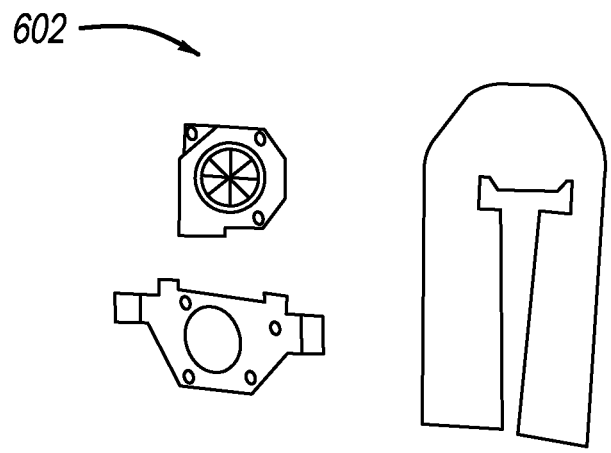
FIG. 2A illustrates a separate unit for cooling.
Figure 2B:
FIG. 2B illustrates a separate unit for heating.
Figure 2C:
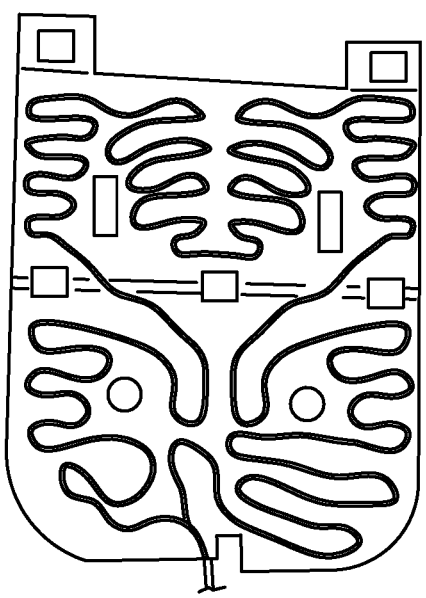
FIG. 2C illustrates a separate unit for occupant sensing.

For reference, FIGS. 2A-C illustrate the prior separate heating mat 601, cooling mat and fan assembly 602, and occupant sensing mat 603, which are not used in the new system 100 of the present disclosure. These prior components are separate units that can be attached to a traditional seat structure.

Returning again to the present disclosure, the thermal structure 108 may be installed with the seat structure 106 in different ways, as further described below. In one aspect, the thermal structure 108 may include a mat portion 116 (FIG. 1) that is disposed between the foam portion 110a and cover portion 110b of leg portion 110 and also between foam portion 112a and cover portion 112b of back portion 112. In another aspect, the thermal structure 108 may be integrated into the material of the cover 110b, 112b, such as by being woven into the material of the cover 110b, 112b or stitched onto the cover 110b, 112b of one or both of the leg portion 110 and back portion 112. For example, in one aspect, the mat portion 116 may be integrated into the cover 110b of the leg portion, but placed between the foam portion 112a and the cover 112b of the back portion 112. FIG. 3 provides a schematic illustration of the thermal structure 108 attached to the seat structure 106 on the leg portion 110. It will be appreciated that such schematic illustration may apply to both the woven and mat form of the thermal structure 108, and may be applied to and/or arranged in the back portion 112 in a similar manner.

Figure 4:
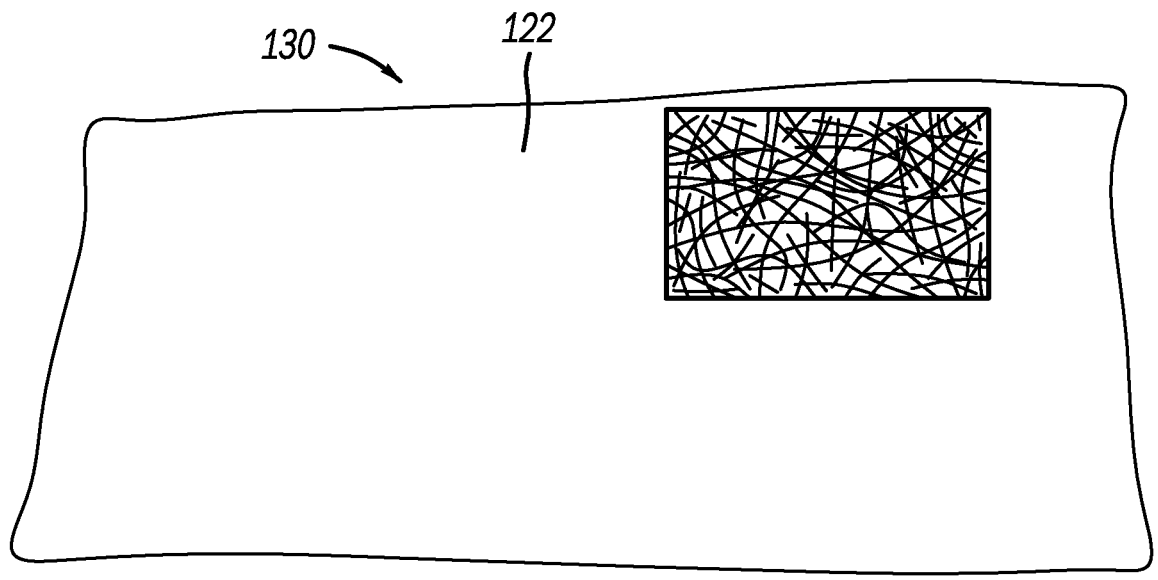
FIG. 4 illustrates CNT elements in the form of a mat, including close-up view of CNT elements within the mat.

In one aspect, the thermal structure 108 includes a plurality of Carbon Nano Tubes (CNT) in the form of a CNT strand 120 (FIG. 5) or a CNT mat 122 (FIG. 4). CNT have excellent thermal conductivity and mechanical durability. In addition to thermal aspects, CNT may also be used to sense the position of the seat occupant. For purposes of discussion, the CNT strand 120 or CNT mat 122 may be referred to generally as CNT element 130. CNT elements 130 are configured to provide a faster thermal response relative to other materials.

Figure 5:
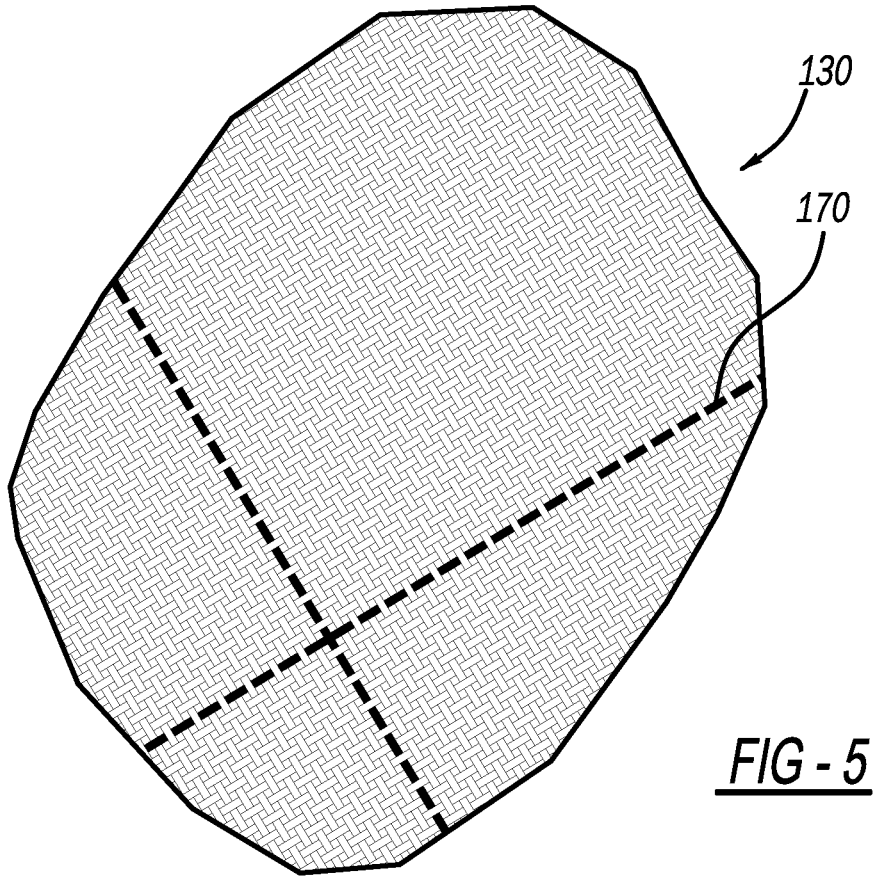
FIG. 5 illustrates CNT elements in the form of a woven strand that is woven into a material for a seat cover.

As shown in FIG. 5, CNT element 130 in the form of CNT strand 120 may be interwoven with other fiber materials that are used to create a fabric surface, such as a seat cover. The CNT strand 120 may extend in multiple directions in the woven material, and the density of the strands 120 relative to the other woven fabric strands may be modified to suit various design needs. For example, a CNT strand 120 may be used every three or four threads, every other thread, or spaced apart from each other even further, such as every 10 threads. CNT strands 120 may be included in a single direction, with the threads extending in the perpendicular direction being free of CNT strands. Put another way, the CNT strands 120 may make up at least a portion of the woven material of the seat cover.

With reference to FIGS. 3 and 4, the CNT element 130 in the form of mat 122 may be cut into a shape that has a winding, serpentine, zig zag, or crossing path, or the like, similar to a woven strand. Similarly, the woven strands may be woven across a large area in a dense pattern so as to create a mat-like structure with integral CNT fibers. Woven CNT strands 120 may be bunched together to define such a path, where increased density in the material of the seat cover defines the shape of the path. For example, in one portion of the "path" of CNT element 130 coverage, the density of CNT strands 120 may be approximately half of the woven material of the cover, and in the non-path areas CNT strands 120 may not be present at all.

As shown in the windowed portion of FIG. 4, the CNT mat 122 includes a plurality of microscopic CNT elements bundled together in a random criss-cross or bird's nest type structure to define the mat 122. The mat 122 may be cut and bound or otherwise shaped into a complex pattern or path to be placed within the seat structure 106.

Figure 6:
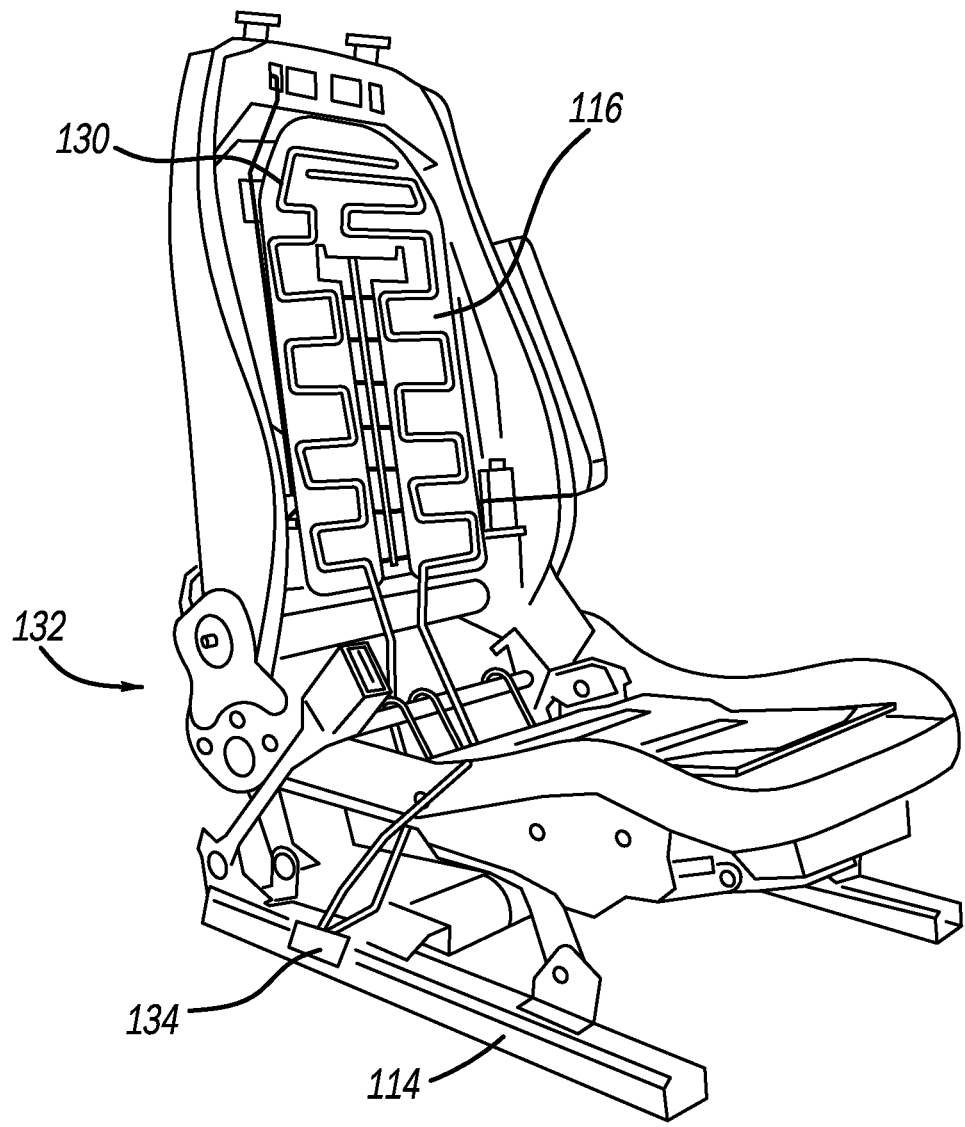
FIG. 6 illustrates CNT elements disposed on a back portion of a vehicle seat, and includes a Peltier element attached to the seat rail.

As described above, in one aspect, the strand 120 may be woven into the material of the cover 110b. The strand 120 may be woven in a pattern that defines a path that crosses back and forth to span an area of the cover 110b for providing heating or cooling to the spanned area, such as that shown in FIGS. 3 and 6. The CNT elements 130 may be used as part of an overall circuit that also includes additional components for transferring heat to/from the spanned area and the area of the cover 110b that overlays the path defined by the CNT strands 120. As described above, the path may be made up of multiple strands that are densely disposed along the path, with non-path areas having little to no CNT strands 120.

In one aspect, and with reference to FIGS. 3, 6, and 7A-B, a thermal circuit 132 is defined that includes CNT element 130 (which may be in the form of CNT strands 120 or the matt 122). In addition to the CNT elements 130, the circuit 132 may further include a Peltier element 134. Peltier elements may also be referred to as Thermoelectric Coolers (TEC), and which provide high accuracy and stability, fast response time, and a wide set-point temperature range. TECs have no moving parts, (unlike motorized fans or the like) and are therefore low noise relative to motor-based fans. The Peltier effect provided by the Peltier element 134 (or TEC 134) is based on the concept of dissimilar metals being heated or cooled depending on the direction in which current passes through them. The general function of a Peltier element is known and will not be discussed in further detail.

Figure 7A:
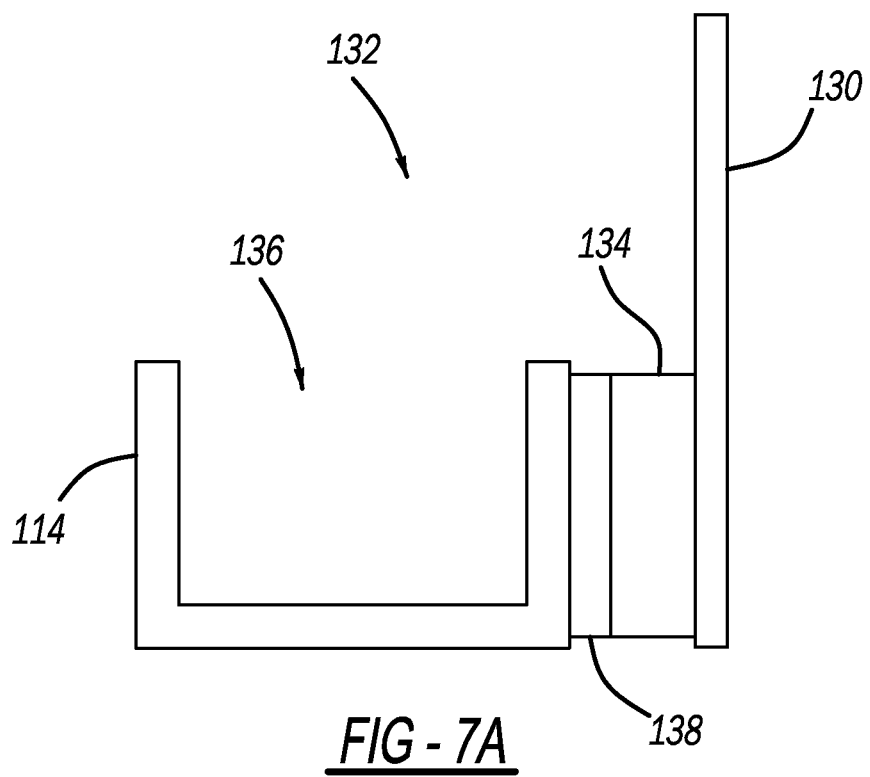
FIG. 7A is a schematic view of a mounting arrangements for the Peltier element attached to a heat bank in the form of a seat rail, and further illustrates a Thermal Interface Material (TiM) disposed between the Peltier element and the heat bank.
Figure 7B:
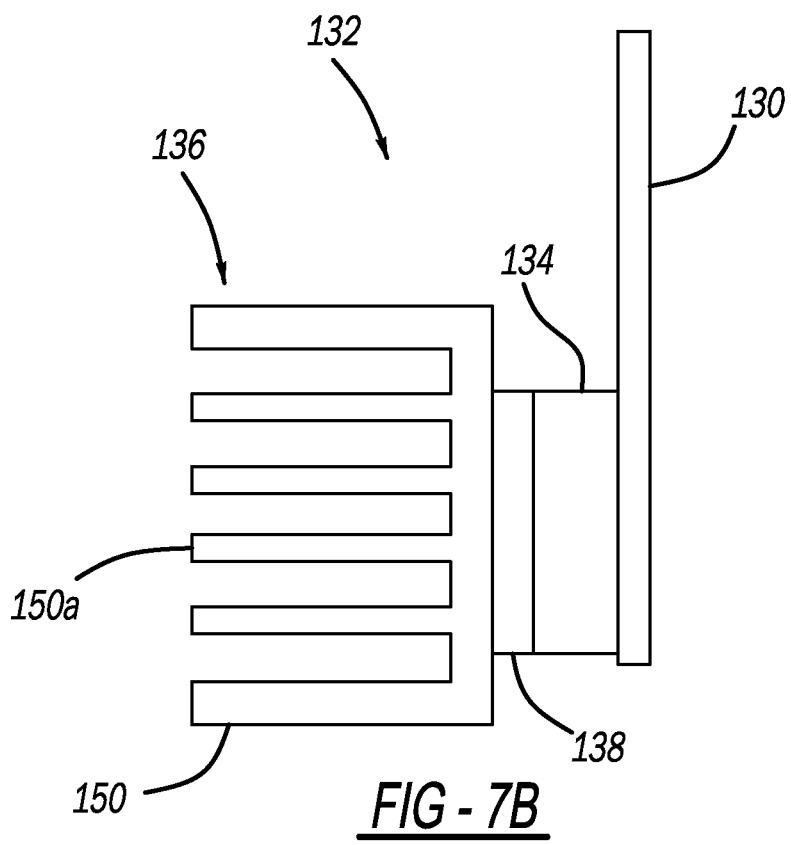
FIG. 7B is a schematic view of a mounting arrangement for the Peltier element attached to a heat sink, and further illustrates a Thermal Interface Material (TiM) disposed between the Peltier element and the heat bank.

Along with the use of Peltier elements 134, the thermal circuit 132 may also include a heat bank 136, as shown in FIGS. 7A and 7B. The heat bank 136 is thermally coupled to the Peltier element 134, such that heat may be transferred therebetween. More particularly, heat may be transferred from the CNT element 130 to the heat bank 136, thereby cooling the CNT element 130 and heating the heat bank 136. In this manner, the temperature of the CNT element 130 decreases, and the temperature of the heat bank 136 increases due to the heat transfer. Thus, with heat being transferred from the CNT element 130 to the heat bank 136, the CNT element 130 may cool the occupant.

In one aspect, shown in FIGS. 7A and 7B, the thermal circuit 132 may further include a thermal interface material (TiM) 138. The TiM is disposed between the Peltier element 134 and the heat bank 136, and operates to improve the heat transfer therebetween. Even when the heat bank 136 and Peltier element 134 have flat and smooth surfaces, on a microscopic level the respective surfaces include various peaks and valleys and voids. Heat transfer occurs between elements in contact with each other, and thus these, peaks, valleys, and voids can limit the available surface area through which the heat transfers, with the voids acting as an insulator rather than a conductor. While the respective surfaces can be polished and made more smooth, voids will still exist. The TiM 138 operates to fill the voids and allow heat to pass more efficiently between the Peltier element 134 and the heat bank 136.

In one aspect, the TiM 138 is a compressible material with high conductivity. In one aspect, the TiM 138 may be a solder, a Room Temperature or Near Room Temperature liquid metal alloy, a thermally conductive adhesive such as an epoxy filled with super-fine particles, thermal greases and compounds, phase change materials, thermal sheets, pads, foils, and the like. Thermal adhesives and solders may provide an added benefit of providing a mechanical attachment between the heat bank 136 and the Peltier element 134. Other thermal interface materials may also be used for improving the heat transfer between the Peltier elements 134 and heat bank 136.

With the TiM 138 disposed between the heat bank 136 and the Peltier element 134, heat may be transferred between the CNT element 130 and the heat bank 136 via the Peltier element 134 and the TiM 138, with the TiM 138 improving the efficiency of the heat transfer.

In one aspect, the Peltier element 134 may be attached to a power supply (or the like) capable of generating a DC current, with the Peltier element 134 including a pair of leads for connecting to the power supply. One side (which may be in the form of a plate) of the Peltier element 134 is attached to a first lead, and the other side (which may also be in the form of a plate) of the Peltier element 134 is attached to a second lead. Current can therefore pass through the Peltier element 134 via these leads connected to the power supply. The direction of current passing through the leads may be controlled by the power supply. For example, current may pass from the first lead to the second lead (a first direction) or current may pass from the second lead to the first lead (a second direction that is opposite the first direction. The direction of current passing between the two leads (as set by the power supply) determines the direction of the heat transfer. In a first direction, with heat flowing from the CNT element 130 to the heat bank 136, the CNT element 130 will be cooled. In a second direction, with heat flowing from the heat bank 136 to the CNT element 130, the CNT element 130 will be heated.

Accordingly, the use of the Peltier element 134 (and its associated leads and power supply) allows the CNT element 130 to be selectively heated or cooled, thereby providing both a heating function and a cooling function from the same element/material. This ability to both heat and cool is an improvement on the separate prior art structures that were limited to only one of either heating or cooling.

In one aspect, the heat bank 136 may be in the form of a heat sink 150 having a plurality of fins 150a, as shown in FIG. 7B. Thus, the Peltier element 134 may be attached or mounted to the heat sink 150 to transfer heat to the heat sink 150. As described above, TiM 138 may be disposed between the Peltier element 134 and the heat sink 150 to improve the thermal conductivity and heat transfer between elements. The heat sink 150 can heat to be stored therein that can thereafter be transferred to the CNT element 134 depending on the direction of current passed through the Peltier element 134. Heat may be stored via heat transfer from the CNT element 130 via the Peltier element 134. Heat may also be discharged via the heat sink when desired.

Accordingly, when the CNT element 130 is hot, for example inside a hot vehicle, the Peltier element 134 may be actuated to transfer heat from the CNT element 130 to the heat sink 150, and heat may be dissipated from the heat sink 150 via the fins 150a. The heat sink 150 may be a separate component attached to the vehicle structure (such as the floor of the vehicle cabin), or it may be attached to the vehicle seat structure 106.

In another aspect, shown in FIG. 7A, the heat bank 136 may be in the form of the vehicle seat rails 114. In this aspect, the Peltier element 134 may be attached or mounted to the seat rails 114 rather than a separate heat sink, and heat may be transferred to the seat rails 114 from the CNT element 130 via the Peltier element 134. The seat rails 114 are metallic and may therefore operate as the heat bank 136, with the temperature of the seat rails 114 increasing when heat is transferred from the CNT element 130 during a cooling operation. The surface of the elongated seat rails 114 can therefore allow for heat to dissipate therefrom.

In one aspect, the seat rails 114 may include fins similar to the heat sink 150 described above. In another aspect, one Peltier element 134 may be mounted to a seat rail 114 and another Peltier element may be mounted to a separate heat sink 150. It will be appreciated that multiple Peltier elements 134 may be used and mounted to multiple types of heat banks 136 (heat sink 150 or seat rail 114).

In one aspect, two Peltier elements 134 may be used, with one Peltier element 134 mounted to one of the seat rails 114, and another Peltier element 134 mounted to the other seat rail 114. Each of the two Peltier elements 134 may be connected to CNT elements 130. By using two Peltier elements 134 mounted to different seat rails 114, the efficiency of the system may be improved. For example, the area of the seat to be heated or cooled may be divided among the Peltier elements 134, such that each Peltier element 134 is responsible for a smaller overall area to be managed thermally. Additionally, the overall area of the heat bank 136 is increased by using both seat rails 114. In one aspect, additional Peltier elements 134 may be provided to further divide the overall heating/cooling circuit. The use of additional Peltier elements 134 may also provide additional control to heat specific portions or locations of the overall seat structure.

In one aspect, the Peltier element 134 may be connected to CNT elements 130 disposed on both the leg portion 110 and the back portion 112 of the seat. When two Peltier elements 134 are used, each Peltier element 134 may be connected to CNT elements 130 disposed on both the leg portion 110 and the back portion 112. In another aspect, one of the two Peltier elements 134 may be connected to CNT elements 130 disposed on the leg portion 110, and the other Peltier element 134 may be connected to CNT elements 130 disposed on the back portion 112.

In one aspect, one Peltier element 134 may be disposed at one end of the seat rail 114, and another Peltier element 134 may be disposed at the opposite end of the seat rail 114, further dividing and dispersing the heat being transferred. Similarly, Peltier elements 134 may be disposed and spaced apart along the heat sink 150 in multiple locations. It will be appreciated that additional Peltier elements 134 may be added to heat sinks 150 or seat rails 114 to further distribute the heat being transferred.

In addition to transferring heat to and from the seat, the CNT element 130 may also be configured to perform occupant detection. For example, the CNT element 130 may be electrically connected to the controller 104, and the controller 104 may receive and process data based on current passing through the CNT element 130 or electrical resistance change due to CNT element change in length caused by the weight of the occupant to determine whether an occupant is present in the vehicle seat. In response to receiving a detected current, resistance, or other data, the controller 104 may automatically determine that the seat is occupied. The same CNT elements 130 used for heating and cooling can be used in a manner similar to traditional occupant detection/sensing systems. In one aspect, the controller 104 may determine which CNT elements 130 from multiple CNT elements have a changed current/resistance and automatically determine which portions of the overall seat structure are occupied. In one aspect, the controller 104 may determine that the seat is not occupied by a passenger even in response to current/resistance changing, based on other CNT elements 130 having an unchanged or substantially unchanged current/resistance. For example, if a heavy object is placed on the seat, only the leg portion of the seat and a lower portion of the back portion may apply weight and cause a current/change in resistance, and the controller 104 may determine that the seat is unoccupied based on the particular CNT elements 130 that are changed relative to the CNT elements 130 that are unchanged.

As described above, the CNT element 130 may be woven into the material of the seat cover 110b/112b, with the ends of the CNT element 130 being attached to the Peltier elements 134. In another aspect, the CNT element 130 may be stitched, as a separate element, to the existing woven material of the seat cover 110b/112b and into an overall assembled form. Accordingly, manufacturing and assembly may be improved, by reducing the number of separate components that are later assembled to define the overall seat. However, it will also be appreciated that the CNT element 130 may be part of a mat structure 116, with the mat structure 116 inserted/placed between the foam of the cushion and the cover of the seat, with the mat 116 having the CNT elements 130 disposed therein. Whether disposed in the mat 116 or attached to the seat cover 110b/112b (via weave or stitching), the CNT elements 130 are disposed adjacent the upper surface of the seat and therefore adjacent the occupant for cooling or heating the seating surface, as desired. This close proximity of CNT element 130 to the seat occupant reduces thermal impedance of the system and decreases heating/cooling ramp up time to the desired temperature.

The operation of transferring heat via the Peltier element 134 and the CNT element 130 is generally the same regardless of the whether the CNT element 130 is a strand woven/stitched to the cover or whether the CNT element 130 is a mat. In each case, current may applied to the CNT element 130 via the Peltier element 134 to transfer heat to/from the CNT element 130 depending on the direction of the current. Thus, regardless of CNT element type, in hot weather, the CNT element 130 may be controlled to transfer heat to the heat bank 136 and away from the occupant, and in cold weather the CNT element 130 may be controlled to increase heat and transfer heat to the occupant.

Figure 8:
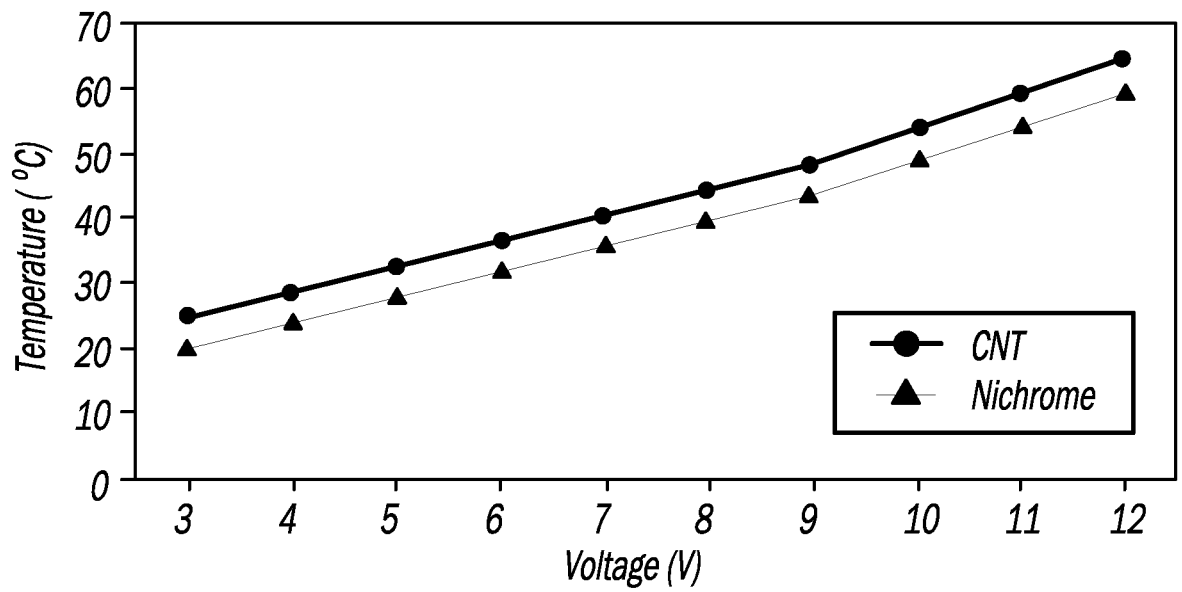
FIG. 8 illustrates a temperature and voltage comparison for a CNT element and a Nichrome element, showing temperature increasing with voltage with the CNT element having a higher temperature for each given voltage.

In addition to using the Peltier elements 134 and the CNT element 130 for heating and cooling described above, the CNT element 130 may be used for resistive heating, wherein a current passes through the CNT element 130 and bypasses the Peltier element 134. In this aspect, the CNT element 130 may heat the seat via resistive heating. The CNT element 130 may provide increased levels of resistive heating relative to Nichrome-based resistive heating. FIG. 8 illustrates a comparison of the temperature response between a CNT element and a Nichrome element, with the CNT element response being improved relative to the Nichrome element.

Thus, in view of the above, heating, cooling, and occupant sensing may be accomplished using a single unit, rather than a separate unit for sensing, a separate unit for heating, and a separate unit for cooling. In one aspect, the CNT element 130 may be used for two of the three aspects, with a separate unit remaining for third aspect, or excluded from the system. For example, the CNT element 130 may be used for heating and cooling, and the occupant sensing may be excluded or managed via a separate element, depending on various design needs. In either case, system efficiency and assembly requirements are improved.

In one aspect, a method of using the system includes providing the CNT element 130 at the seat structure. The method further includes providing the Peltier element 134 attached to the CNT element 130. The method further includes providing the heat bank 136 attached to the Peltier element 130. In one aspect, the method includes applying a current to the Peltier element 134 and the CNT element 130 in a first direction, and in response thereto transferring heat from the CNT element 130 to the heat bank 136 and decreasing the temperature of the CNT element 130. The method may further include applying a current to the Peltier element 134 and the CNT element in a second direction opposite the first direction, and in response thereto increasing the heat of the CNT element 130. The method may also include bypassing the Peltier element and passing a current through the CNT element to provide resistive heating.

With reference to FIG. 8, a temperature comparison of CNT element 130 relative to Nichrome element is shown. The graphic of FIG. 8 illustrates a relationship between voltage applied to the CNT element 130 and the temperature of the CNT element, illustrating the use of the CNT element 130 for generating heat. For each voltage, the CNT element 130 has a higher temperature than the Nichrome element.

Figure 9:
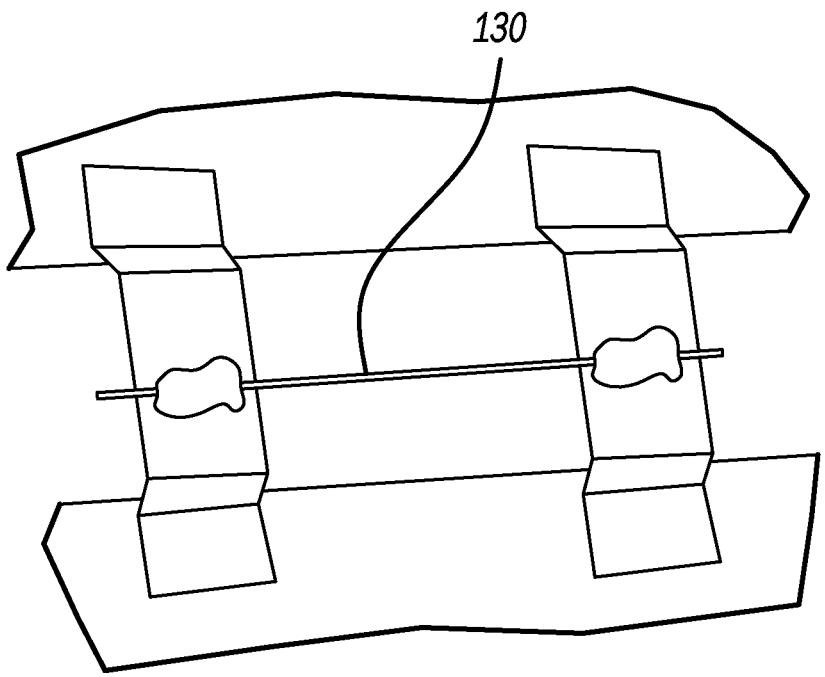
FIG. 9 is another illustration of the CNT element disposed within a material.

FIG. 9 illustrates additional representations of a CNT element 130 disposed within a material.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A vehicle seat system comprising:
   a seat structure;
   a carbon nanotube (CNT) element attached to the seat structure;
   a Peltier element attached to the carbon nanotube element;
   a heatbank attached to the Peltier element;
   a power supply electrically connected to the Peltier element, wherein the power supply is configured to apply a current to the Peltier element and the CNT element;
   wherein the Peltier element transfers heat between the CNT element and the heatbank in response to applying the current.

2. The system of claim 1, wherein the CNT element is adapted to receive current from the power supply and provide resistive heating and bypass the Peltier element.

3. The system of claim 1, wherein the CNT element is adapted to deform in response to the presence of a vehicle occupant to alter the current and/or resistance in the CNT element.

4. The system of claim 1, wherein the heatbank is a seat rail of the seat structure.

5. The system of claim 1, wherein the heatbank is a heatsink including a plurality of fins.

6. The system of claim 1, wherein current passing in a first direction causes heat transfer from the CNT element to the heatbank via the Peltier element, and current passing in a second direction opposite the first direction causes heat transfer from the heatbank to the CNT element via the Peltier element.

7. The system of claim 1, wherein the Peltier element is a first Peltier element and the system includes a second Peltier element, wherein the first and second Peltier element are operatively connected to separate CNT elements configured to heat and cool separate portions of the vehicle seat.

8. The system of claim 7, wherein the heatbank has the first and the second Peltier elements mounted at opposite ends thereof.

9. The system of claim 1, wherein the CNT element is a mat.

10. The system of claim 1, wherein the CNT element is woven into a seat cover.

11. A method of thermally managing a vehicle seat, the method comprising:
    providing a carbon nanotube (CNT) element at a vehicle seat;
    providing a Peltier element attached to the CNT element;
    providing a heatbank attached to the Peltier element;
    providing a power supply electrically connected to the Peltier element, wherein the power supply is configured to apply a current to the Peltier element;
    applying a current to the Peltier element from the power supply in a first direction, and in response thereto transferring heat from the CNT element to the heatbank and cooling the CNT element;
    applying a current to the Peltier element from the power supply in a second direction opposite the first direction, and in response thereto transferring heat to the CNT element and heating the CNT element.

12. The method of claim 11, further comprising detecting a vehicle occupant via the CNT element by detecting a change in current and/or resistance passing in the CNT element.

13. The method of claim 11, wherein the heat bank is in the form of a heat sink.

14. The method of claim 11, wherein the Peltier element is attached to a seat and the seat rail comprises the heatbank.

15. The method of claim 11, wherein the CNT element is woven into a seat cover of the vehicle seat or disposed in a mat disposed between a seat cover and a seat cushion of the vehicle seat.

16. A method of thermally managing a vehicle seat, the method comprising:
providing a carbon nanotube (CNT) element at a vehicle seat;
providing a Peltier element attached to the CNT element;
providing a heatbank attached to the Peltier element;
applying a first current to the Peltier element and transferring heat from the CNT element to the heatbank;
applying a second current to the Peltier element and transferring heat to the CNT element from the heatbank;
detecting a vehicle occupant via the CNT element by detecting a change in current and/or resistance passing in the CNT element.

17. The method of claim 16, wherein the first current is in a first direction, and the second current is in a second direction opposite the first direction, wherein the direction of current controls the direction of heat transfer between the CNT element and the heatbank via the Peltier element.

18. The method of claim 16, wherein the Peltier element is attached to a seat rail and the seat rail comprises the heatbank.

19. The method of claim 16, further comprising providing a power supply electrically connected to the Peltier element, wherein the power supply is configured to apply a current to the Peltier element and the CNT element.

20. The method of claim 19, wherein current from the power supply is applied to the Peltier element to transfer heat between the heatbank and the CNT element, and is further applied directly to the CNT element to provide resistive heating via the CNT element.

* * * * *